Patented Feb. 6, 1934

1,946,146

UNITED STATES PATENT OFFICE 1,946,146

INORGANIC INSULATION FOR ELECTRICAL SHEETS

George C. Kiefer, Springdale, and Charles A. Scharschu, Brackenridge, Pa., assignors to Allegheny Steel Company, a corporation of Pennsylvania No Drawing. Application June 18, 1931
Serial No. 545,370

14 Claims. (Cl. 175—21)

This invention relates to inorganic enamels for electrical sheets and to method of applying the same to such sheets.

Most inorganic substances which might be suitable for the purposes of this invention are not soluble in water and hence it is difficult or impossible to apply the substances evenly to the surfaces of a sheet.

One of the objects of the present invention is the provision of an inorganic enamel and one which can be applied evenly to the surfaces of electrical sheets.

Another object is the provision of a water soluble inorganic insulating coating for electrical sheets containing substances which can be deposited evenly on a sheet.

An additional object is the depositing of a precipitate on such a sheet and baking it in situ to form the insulating coating.

A further object is the provision of a method of applying an inorganic insulation to such electrical sheets.

A still further object is the provision of a method of applying an inorganic insulation to electrical sheets which is soluble in water and which can be evenly deposited or distributed over the surfaces of the sheets.

Other and further objects will be understood by those skilled in this art or will be pointed out hereinafter.

Soluble sodium silicate or water glass has been applied as an inorganic insulation for electrical sheets. Its insulation resistance, however, is comparatively low and when applied in thin coats to sheets, it does not offer sufficient protection against rust. It is well known that when aqueous solutions of sodium silicate or water glass are treated with acids or even with certain inorganic salts, that the salt may decompose with the separation of gelatinous silica or the precipitation of an insoluble silicate may occur. While the resulting mixture may have properties which would make it a suitable electrical insulation yet the use of insulation material of this character is unsatisfactory, as it is difficult to apply to the sheet in a thin and uniform continuous coat.

We have found that when certain inorganic salts or acids or certain metallic organic salts are added to a soluble silicate such as sodium silicate or water glass within certain limits of concentration, no precipitate is formed and the resulting solution has desirable and valuable properties as an electrical insulation when applied to sheet steel. Such salts as ferric tartrate or ferric citrate or chromium tartrate or citrate or chromic acid may serve as an example of the character of substances which may be used.

For example, mixing chromic acid and soluble sodium silicate in the following proportions will not cause precipitation, and the solution, when applied, will have desirable insulating characteristics:

| | Gallons |
|---|---|
| Sodium silicate 40° Bé | 3 |
| Water | 2½ |
| Chromic acid (20% solution) | .8 |

The thickness of the coating may be varied by changing the concentration of the solution used. For example, when chromic acid and soluble sodium silicate are mixed in the proportions given below, a slight precipitate will form, but which can be removed by screening or filtering after which no more precipitation will occur.

| | Gallons |
|---|---|
| Sodium silicate 40° Bé | 2 |
| Water | 1 |
| Chromic acid (20%) | 1.8 |

Substances other than chromic acid may be used, such as chromium citrate or tartrate or other metallic salts in combination with a soluble silicate.

Sheets to be coated are either run in a suitable fashion through a bath containing the solution and through a set of rolls of suitable type to wipe off the excess solution or the solution may be applied directly with a set of rolls. The coated sheets are then run through a drying and baking oven. When the sheets are run through the oven, the excess moisture is driven off and precipitation occurs on the surface of the sheet. When chromic acid or chromium salts are used, some chromium silicate is probably precipitated together with silica and other salts which are in solution which are baked on the surface of the sheet. Similarly when other salts or acids are used probably a silicate of the metal added, together with silica, will be precipitated. This coating is not only a satisfactory electrical insulation, but also when fired at sufficiently high temperatures, namely above 400° F., protects the sheets from rusting. While ordinary chromium salts are characterized by the fact that they will pick up moisture from the atmosphere (i. e., they are hygroscopic) yet when the insulating coating formed in the above manner is fired at a sufficiently high temperature as above indicated, such insulating coating does not have this undesirable property. The rolls may also act to distribute the solution evenly over the surface of the sheet.

We have found that for some applications, it is desirable to use acids or salts which when added to a soluble silicate will form a precipitate. For the production of heavy coatings, it is sometimes necessary to apply a relatively large amount of the insulating material to the surfaces of the sheet so that it will be found impossible to prepare the insulation without the formation of a precipitate. As stated before, these mixtures are difficult to apply. We have found that this objection can be overcome by first coating the sheet with the proper thickness of a soluble silicate by passing it through a bath of the soluble silicate of proper concentration followed by a set of rolls or wipers to remove the excess or applying the soluble silicate by means of a set of rolls and then passing the sheet through a second bath containing a salt or acid which will form a precipitate directly on the surface of the sheet. By this method, the insulating coat is evenly distributed. The sheet is then dried and baked as described above.

For example, for some applications a 10% bath of water glass may be used. The sheet is then passed through rolls into a bath of chromic acid of such concentration that the precipitate is deposited evenly over the surface of the sheet. In many cases it is found that a 10% solution of chromic acid is satisfactory. The sheet then passes through rolls and through a drying oven to drive off excess moisture and bake the coating on the surface of the sheet.

For baking the coat a suitable oven temperature is used. 1400° Fahrenheit has been found suitable for example. The coated sheet may be passed through the oven on a conveyor belt so that it comes to temperature uniformly, the time of passage through the oven being about one minute. Under the conditions the sheet probably does not reach a temperature above 600 or 700° Fahrenheit. The time of exposure generally varies inversely to the oven temperature.

We have also found that when sheets coated in the manner described above, are annealed that the insulation is not destroyed, but that the insulation resistance increases. This increase is from 25 to 100%.

We find that this method of application can be used with other acids than chromic acids and we do not, therefore, intend our disclosure in a limitative sense. It is also clear that we may still further vary the ingredients or the procedure in certain respects without departing from the spirit and scope of the invention and such will be understood by those skilled in this art.

What I claim as new and desire to secure by Letters Patent is:

1. An inorganic insulation consisting of a solution composed of 2 parts sodium silicate, 1 part water and 1.8 parts of 20% chromic acid, adapted to precipitate chromium silicate upon exposure to heat.

2. The method of insulating metal sheets adapted for use in electrical apparatus including the steps of passing such sheets through a solution consisting of about 2 parts sodium silicate, about 1 part water and about 1.8 parts of 20% chromic acid, drying and baking.

3. The method of insulating metal sheets adapted for use in electrical apparatus including the steps of passing such sheets through a solution consisting of about 2 parts of sodium silicate, about 1 part of water, and about 1.8 parts of chromic acid, passing them through a set of rolls to wipe off excess solution, drying and baking at a temperature high enough to drive off excess water, to form a precipitate and to bake the precipitate when formed onto the sheets.

4. The method of insulating metal sheets adapted for use in electrical apparatus including the steps of passing such sheets through a solution consisting of about 2 parts of sodium silicate, about 1 part of water and about 1.8 parts of chromic acid, passing them through a set of rolls to wipe off excess solution, drying and baking by passing them through an oven at about 1400° F., whereby a precipitate is formed on the sheets and the precipitate baked thereonto.

5. The method of insulating metal sheets adapted for use in electrical apparatus including the steps of passing such sheets through a solution consisting of about 2–3 parts of sodium silicate, about 1–2.5 parts of water and about 1.8–.8 parts of chromic acid, passing them through a set of rolls to wipe off excess solution, drying and baking by passing them through an oven at about 1400° F., said sheets being in said oven for only about one minute, whereby a precipitate is formed on and baked onto said sheets.

6. The method of insulating metal sheets adapted for use in electrical apparatus including the steps of passing such sheets through a solution consisting of 2–3 parts sodium silicate, 1–2.5 parts water and 1.8–.8 parts chromic acid, passing them through a set of rolls to wipe off excess solution, drying and baking by passing them through an oven at about 1400° F., said sheets being in said oven for only about one minute and themselves reaching a temperature not over about 600–700° F., whereby a precipitate is formed on and baked onto said sheets.

7. An inorganic insulation comprising soluble silicate about 3 parts, water about 2½ parts, and chromic acid 0.8 parts, adapted to deposit a precipitate upon predetermined thermal treatment thereof.

8. In a method of insulating metal sheets adapted for use in electrical apparatus, coating such sheets with suitable amounts of a soluble silicate, passing said coated sheets through a chromic acid bath to form an electrical insulating precipitate directly on said sheets, and drying and baking said sheets and the precipitate thereon.

9. In a method of insulating metal sheets adapted for use in electrical apparatus, coating such sheets with a predetermined soluble silicate material, so treating said coated sheets with an insoluble silicate precipitant material as to cause such a precipitate to form directly on the surface of the sheets, and finishing said sheets so as to provide the ultimate desired electrical insulation, said coating and treating steps being successive.

10. In a method of insulating metal sheets adapted for use in electrical apparatus, coating such sheets with a predetermined soluble silicate material, so treating said coated sheets with an insoluble silicate precipitant material as to cause such a precipitate to form directly on the surfaces of the sheets, and finishing said sheets so as to provide the ultimate desired electrical insulation, said coating and treating steps being simultaneous.

11. An insulated metal sheet adapted for use in electrical apparatus and comprising a metal sheet as a base and a baked, adherent inorganic coating thereon developed from a coating-providing bath containing sodium silicate, water and chromic acid.

12. A bath for coating metal sheets adapted for use in electrical apparatus with an insoluble silicate coating which, when dried and fixed thereon, provides such a sheet with 25-100% improved electrical characteristics, comprising the following constituents in substantially the following proportions: sodium silicate (40° Bé.) 2-3 parts; chromic acid (20%) 1.8-0.8 parts; water 1-2½ parts.

13. A bath for coating metal sheets adapted for use in electrical apparatus with an insoluble silicious coating which, when dried and fixed thereon, provides such a sheet with 25-100% improved electrical characteristics, comprising about 3 parts sodium silicate (40° Bé.), about 2½ parts water, and about 0.8 parts chromic acid (20%) said sodium silicate, water and chromic acid in such amounts and concentrations remaining free from precipitate but providing, when on said sheets and exposed to heat, a non-hygroscopic coating adapted to develop and deposit such a silicious coating thereupon.

14. An insulating coating consisting of the products of reaction of 3 parts sodium silicate, 2½ parts water and 0.8 parts chromic acid developed and fixed in situ by suitable thermal means.

GEORGE C. KIEFER.
CHARLES A. SCHARSCHU.